June 11, 1940.  A. B. BELL  2,204,205
ARMREST SUPPORT
Filed Aug. 4, 1937  2 Sheets-Sheet 1

Inventor
Alfred B. Bell
by Wright, Brown,
Quinby & May
Attys.

June 11, 1940.  A. B. BELL  2,204,205
ARMREST SUPPORT
Filed Aug. 4, 1937  2 Sheets-Sheet 2
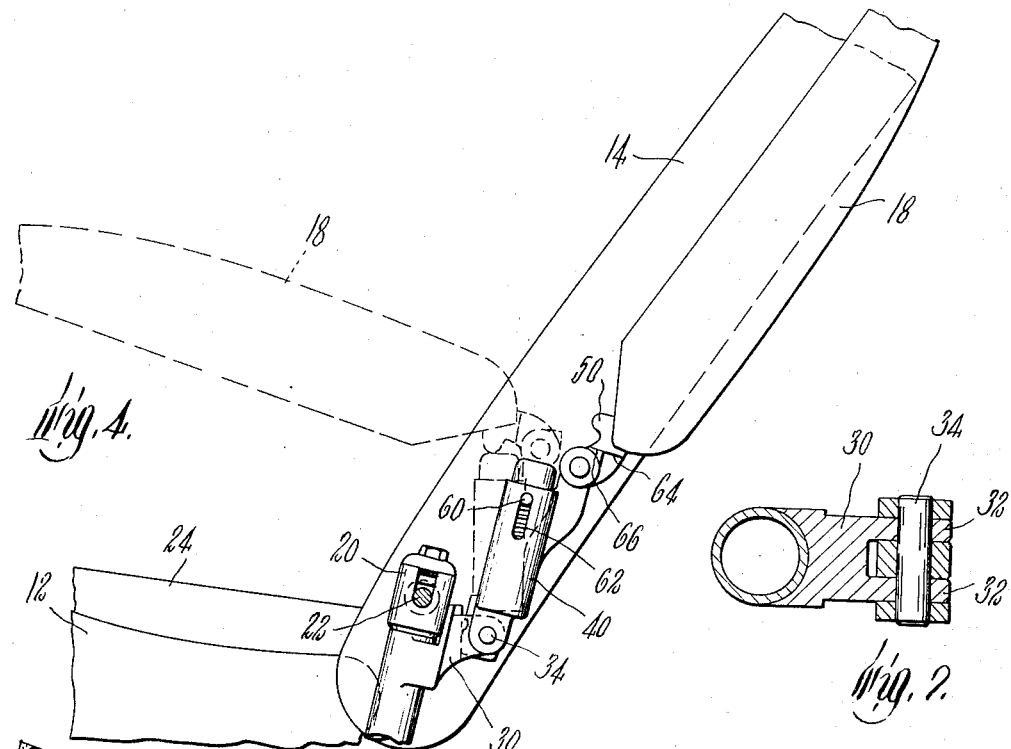
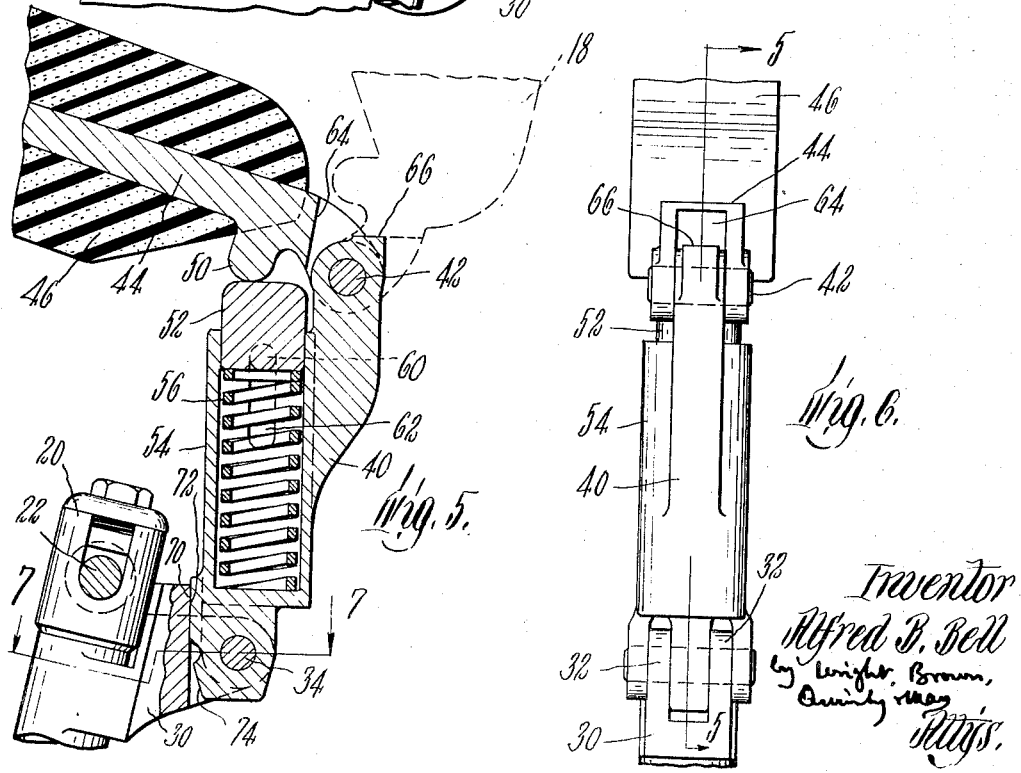
Inventor
Alfred B. Bell Patented June 11, 1940

2,204,205

UNITED STATES PATENT OFFICE 2,204,205

ARMREST SUPPORT

Alfred B. Bell, Gardner, Mass., assignor to Heywood-Wakefield Company, Gardner, Mass., a corporation of Massachusetts Application August 4, 1937, Serial No. 157,295

1 Claim. (Cl. 155—112)

This invention relates to armrests for seats or chairs, and more particularly to armrests for multiple seats, that is, a plurality of seats arranged side by side. In such case, the individual seats are often defined or separated by armrests between them. For example, in a bus or railway coach, a double seat is often provided with a central armrest which also serves to define the spaces to be occupied by the two passengers on the seat. When a passenger in a vehicle attempts to sit down on such a seat while the vehicle is in motion, the vehicle is liable to lurch so as to cause the passenger to come down on the arm-rest instead of on one of the seats. According to the present invention, an armrest is provided which can be swung back into approximate alinement with the seat back, and which is also capable of yielding downward from its position for use in response to pressure thereon exceeding a predetermined magnitude so as to avoid injury to passengers who may be caused to sit down thereon unexpectedly. To this end, a spring device is provided to maintain the armrest in position for the support of a passenger leaning a forearm thereon, but adapted to yield to the weight of a person sitting thereon.

For a more complete understanding of the invention, reference may be had to the following description thereof and to the drawings of which Figure 1 is a plan view of a seat in which the invention is embodied.

Figure 4 is a section similar to Figure 3 but showing the parts in different positions.

Figure 5 is a section on the line 5—5 of Figure 6.

Figure 6 is a front elevation of the supporting means for the armrest.

Figure 7 is a section on the line 7—7 Figure 5.

Figures 1, 2:
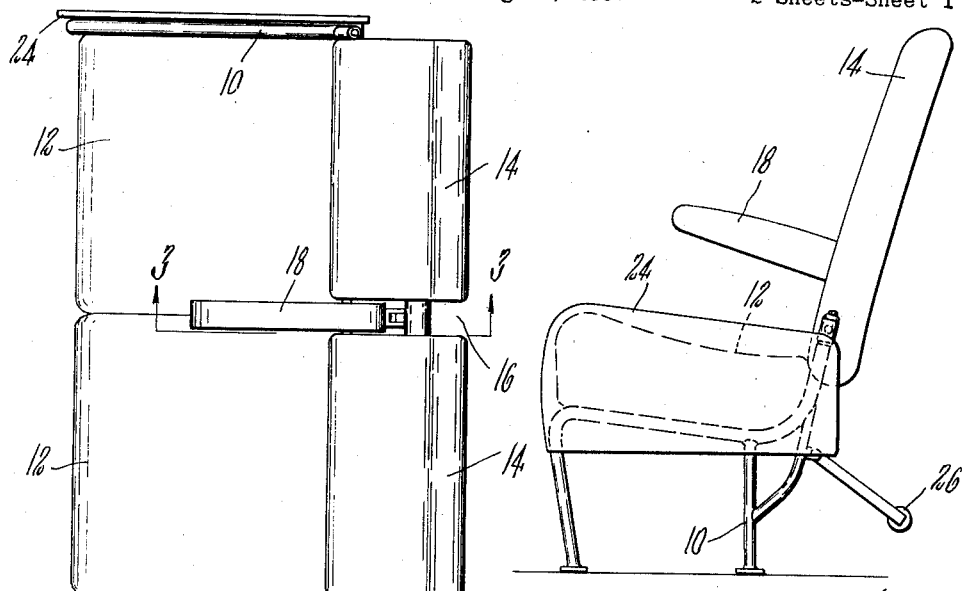
Figure 2 is a side elevation of the same.
Figure 3:
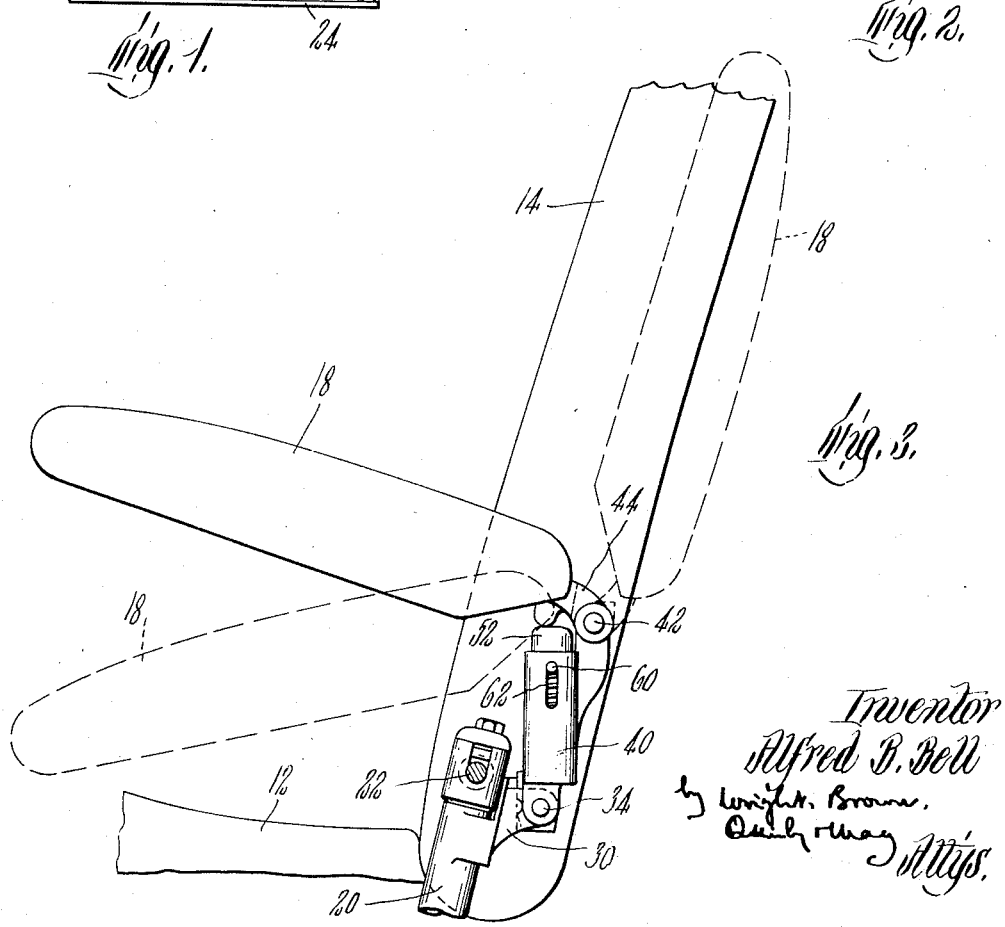
Figure 3 is a section on the line 3—3 of Figure 1, the armrest being shown in various positions.

The drawings illustrate a double seat such as may be used for motor buses, railway coaches, or the like. As shown in Figures 1 and 2, the seat may comprise a stationary frame 10 to support a pair of individual seat cushions 12. The frame 10 may be tubular or may be made otherwise as desired. The seat includes a pair of backs 14 which, as shown, may be separated by a gap 16 wide enough to receive an armrest 18 which is between and defines the individual seat spaces. The backs 14 may be pivotally mounted on the frame 10 for angular adjustment. As shown, the frame 10 includes three standards or posts 20 within the upper ends of which the seat-backs 14 are journaled as indicated in Figure 3. To this end, each seat-back is provided with a pair of stub shafts 22 rockable in the upper end portions of the posts 20. Suitable means (not shown) are provided for adjusting the seat-backs individually to any desired angle of inclination within their range of motion. Various mechanisms for this purpose are known and used in the industry.

If desired, the seat may be supplied with one or two suitable side plates or shields 24 to retain the seat cushions 12 in place. A suitable foot-rest 26 may also be mounted at the rear of the frame 10.

According to the invention, the central armrest 18 is pivotally supported by the central post 20 so as to be free to be swung from a position for use, such as illustrated in full lines in Figure 3, to an upright idle position indicated in dotted lines in the same figure. To this end, the central post 20 is provided with a rearwardly extending bracket 30 which may be welded or otherwise secured to the post. This bracket is provided with a pair of ears 32, as indicated in Figures 6 and 7, which support a hinge pin 34 about which may rock a link member 40. This link member has a hinge connection 42 with the rear end of the armrest 18.

The armrest may be of any preferred construction. As indicated in Figure 5, it may have a rigid frame element or skeleton 44 covered with a heavy layer or cushion 46 of sponge rubber or the like. The rearward end of the frame element 44 is hinged to the upper end of the link 40 by the hinge pin 42. Near the hinge pin 42 is a boss 50 on the frame member 44 of the armrest, this boss serving as a stop element to cooperate with a stop element 52 which is in the form of a plunger mounted in a hollow portion 54 of the link 40. Within this hollow portion is a stiff spring 56, one end of which bears against the plunger 52 and presses it upwardly. The upward limit of movement of the plunger 52 is determined by a pin 60 which rides in a slot 62 in the side of the hollow portion 54 of the link 40. The cooperating stop elements 50 and 52 determine the normal position of the armrest 18 for use, this position being either approximately horizontal or sloping somewhat upwardly and forwardly as indicated in Figure 3. The stop element 52, however, is resiliently yielding due to the spring 56 which is behind it. This spring is preferably sufficiently stiff and under sufficient initial compression to maintain the armrest in its normal position for ordinary use, as when a passenger leans thereon. If, however, a passenger should accidentally sit upon the armrest 18, owing to lurching of the vehicle or for any other reason, the armrest will yield to the lower position indicated in dotted lines in Figure 3, thus avoiding possible injury to the passenger.

Associated with the hinge 42 is another pair of stop elements 64 and 66 which are positive and which definitely limit the rearward swing of the armrest 18 when it is moved to its idle position between the two portions 14 of the seat-back. These stop elements may comprise surfaces on the frame member 44 and the link 40 respectively, which engage each other when the armrest is swung to the upright position indicated in dotted lines in Figure 5.

As previously stated, the seat-back 14 is preferably mounted for adjustment to change its angle of inclination. It is desirable that the upper end of the link 40 be well back of the front face of the upholstery on the seat-back 14 for any position of the seat-back, this being for the purpose of avoiding any possible injury to the passenger which might arise from bodily contact with the link. It is for this reason that the link itself is hinged to the bracket 30 by the hinge pin 34 so that it can be swung back through a limited angle, as indicated in Figure 4, to keep the link well behind the front face of the upholstery of the back. The limits of the rocking angle of the link about its pivot 34 are definitely determined by stop elements. The forward rocking movement of the link 40 is limited by a surface 70 on the bracket which is abutted by a surface 72 as shown in Figure 5. The rearward movement of the link is limited by a surface 74 which acts as a stop element in cooperation with the surface 70 of the bracket 30, as indicated in Figure 4. The double-hinged connection between the armrest and the stationary seat-frame thus not only permits swinging the armest to an idle position in the gap 16 between the portions of the seat-back 14 for any angle of inclination of the seat-back 14, but also permits a rearward swing of the link 40 sufficient to keep it well behind the forward face of the seat-back upholstery for any angle of inclination of the seat-back. This feature, in conjunction with the yielding of the armrest downwardly in response to strong pressure such as the weight of the person attempting to sit down on the seat, results in security to the passenger from any possible injury which might otherwise result from lurching of the vehicle or loss of balance on the part of the passenger attempting to sit on the seat.

It is evident that various modifications and changes may be made in the specific embodiment of the invention herein shown and described, without departing from the spirit or scope thereof as defined by the following claim.

I claim:

A seat having a stationary frame, a tubular upstanding link hinged to said frame and rockable in a front-to-rear plane, means adjacent to the hinge limiting the rocking movement of said link, a plunger normally projecting from the upper end of said link, a spring within said link pressing said plunger upward, a bracket on said link near the upper end thereof, an armrest pivotally attached to said bracket, and means for limiting the pivotal movement of said armrest relative to said bracket, said last-named means including said plunger and an abutment element on said armrest arranged to engage said plunger when the armrest is moved to its horizontal position for use.

ALFRED B. BELL.